(12) United States Patent
Stamires et al.

(10) Patent No.: US 6,800,578 B2
(45) Date of Patent: Oct. 5, 2004

(54) PROCESS FOR PRODUCING ANIONIC CLAY USING BOEHMITE WHICH HAS BEEN PEPTIZED WITH AN ACID

(75) Inventors: Dennis Stamires, Newport Beach, CA (US); Paul O'Connor, Hoevelaken (NL); William Jones, Cambridge (GB); Michael Brady, Studio City, CA (US)

(73) Assignee: Akzo Nobel NV (NL)

( * ) Notice: Subject to any disclaimer, the term of this patent is extended or adjusted under 35 U.S.C. 154(b) by 29 days.

(21) Appl. No.: 10/271,920

(22) Filed: Oct. 15, 2002

(65) Prior Publication Data

US 2003/0087750 A1 May 8, 2003

Related U.S. Application Data

(63) Continuation-in-part of application No. 09/491,264, filed on Jan. 26, 2000, now abandoned.
(60) Provisional application No. 60/117,934, filed on Jan. 29, 1999.

(51) Int. Cl.$^7$ .............................................. B01J 21/16
(52) U.S. Cl. ........................... 501/141; 502/80; 502/84; 423/600
(58) Field of Search ............................... 501/141, 108, 501/118, 119; 502/341, 80, 84, 63; 423/600, 499.1, 463, 464, 465; 51/141, 108, 118, 119

(56) References Cited

U.S. PATENT DOCUMENTS

| | | | |
|---|---|---|---|
| 3,796,792 A | 3/1974 | Miyata et al. | 423/250 |
| 3,879,523 A | 4/1975 | Miyata et al. | 423/277 |
| 3,879,525 A | 4/1975 | Miyata et al. | 423/277 |
| 4,351,814 A | 9/1982 | Miyata et al. | 423/306 |
| 4,454,244 A | 6/1984 | Woltermann | 502/208 |
| 4,458,026 A | 7/1984 | Reichle | 502/80 |
| 4,656,156 A | 4/1987 | Misra | 502/415 |
| 4,843,168 A | 6/1989 | Drezdzon et al. | 558/357 |
| 4,904,457 A | 2/1990 | Misra | 423/115 |
| 4,946,581 A | 8/1990 | van Broekhoven | 208/120 |
| 4,952,382 A | 8/1990 | van Broekhoven | 423/244 |
| 4,970,191 A | 11/1990 | Schutz | 502/341 |
| 5,079,203 A | 1/1992 | Pinnavaia et al. | 502/84 |
| 5,114,898 A | 5/1992 | Pinnavaia et al. | 502/406 |
| 5,399,537 A | 3/1995 | Bhattacharyya et al. | 502/84 |
| 5,439,861 A | 8/1995 | Bhattachayya et al. | 502/84 |
| 5,507,980 A | 4/1996 | Kelkar et al. | 264/15 |
| 5,514,316 A | 5/1996 | Kosugi et al. | 264/86 |
| 5,543,173 A | 8/1996 | Horn, Jr. et al. | 427/212 |
| 5,578,286 A | 11/1996 | Martin et al. | 423/593 |
| 5,591,418 A | 1/1997 | Bhattacharyya et al. | 423/239 |
| 5,814,291 A | 9/1998 | Kelkar | 423/395 |
| 5,858,413 A | 1/1999 | Jettka et al. | 424/682 |
| 6,090,412 A | 7/2000 | Hashimoto et al. | 424/490 |

FOREIGN PATENT DOCUMENTS

| | | | |
|---|---|---|---|
| EP | 0 536 879 | 4/1993 | C01G/1/00 |
| EP | 725038 | 8/1996 | C01G/55/00 |
| JP | 401034216 | 2/1989 | |
| WO | WO/91/10505 | 7/1991 | B01J/8/00 |

OTHER PUBLICATIONS

*Materials Chemistry and Physics, Textural Properties of Hydrotalcite–Like Compounds* . . . 14, pp. 569–579, (1986), no month.
*Clays and Clay Minerals, Syntheses of Disordered and Al–Rich Hydrotalcite–Like Compounds* 34, pp. 507–510, vol. 34, No. 5, (1986), no month.
*Clays and Clay Minerals,Physico–Chemical Properties of Synthetic Hydrotalcites in Relation to Composition*, vol. 28, No. 1, pp. 50–58, (1980), no month.
*Clays and Clay Minerals, The Syntheses of Hydrotalite–Like Compounds and Their Structures and Physico–Chemical* . . . , vol. 23, pp. 369–375, (1975), no month.
*Catalysis Today, Hydrotalcity–Type Anionic Clays: Preparation, Properties and Applications* 11, pp. 173–301, (1991), no month.
*Hel. Chim. Acta*, 25 pgs. 106–137 and 555–569, (1942), no month.
*J. Am. Ceram. Soc., Studies on 4CaO–Al$_2$O$_3$—13H$_2$O and the Related Natural Mineral Hydrocalumite* 42, No. 3, pp. 121–126, (1959), no month.
*Chemistry Letters, Synthesis of New Hydrotalcit–Like Compounding and Their Physico–Chemical Properties*pp. 843–848, (1973), no month.
*Anionic Clays: trends in pillary chemistry, its synthesis and microporous solids* (1992), 2, pp. 108–165, no month.

Primary Examiner—Michael Marcheschi
(74) Attorney, Agent, or Firm—Louis A. Morris

(57) ABSTRACT

This patent describes economical and environment-friendly processes for the synthesis of anionic clays. It involves reacting a slurry comprising boehmite, which has been peptized with acid with a divalent metal source followed by addition of source of base. The slurry is then hydrothermally aged. There is no necessity to wash or filter the product and it can be spray dried directly to form microspheres, or can be extruded to form shaped bodies. The product can be combined with other ingredients in the manufacture of catalysts, absorbents, pharmaceuticals, cosmetics, detergents, polymeric nanocomposites and other commodity products that contain anionic clays.

23 Claims, No Drawings

PROCESS FOR PRODUCING ANIONIC CLAY USING BOEHMITE WHICH HAS BEEN PEPTIZED WITH AN ACID

REFERENCE TO RELATED APPLICATIONS

The present application is a continuation-in-part of U.S. application Ser. No. 09/491,264, filed Jan. 26, 2000, now abandoned which claims priority of U.S. Provisional Patent Application Ser. No. 60/117,934, filed Jan. 29, 1999.

BACKGROUND OF THE INVENTION

1. Field of the Invention

This invention involves the preparation of anionic clays.

2. Prior Art

Anionic clays have a crystal structure which consists of positively charged layers built up of specific combinations of metal hydroxides between which there are anions and water molecules. Hydrotalcite is an example of a naturally occurring anionic clay, in which carbonate is the predominant anion present. Meixnerite is an anionic clay wherein $OH^-$ is the predominant anion present.

In hydrotalcite-like anionic clays the brucite-like main layers are built up of octahedra alternating with interlayers in which water molecules and anions, more particularly carbonate ions, are distributed. The interlayers contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{-6}$ and $MO_7O_{24}^{6-}$, monocarboxylates such as acetate, dicarboxylates such as oxalate, alkyl sulfates such as laurylsulfonate.

It should be noted that a variety of terms are used to describe the material, which is referred to in this patent as an anionic clay. Hydrotalcite-like and layered double hydroxide are interchangeably used by those skilled in the art. In this patent application we refer to the materials as anionic clays, comprising within that term hydrotalcite-like and layered double hydroxide materials.

The preparation of anionic clays has been described in many prior art publications. Recently, two major reviews of anionic clay chemistry were published in which the synthesis methods available for anionic clay synthesis have been summarized, F. Cavani et al "Hydrotalcite-type anionic clays: Preparation, Properties and Applications, *Catalysis Today*", 11 (1991) Elsevier Science Publishers B. V. Amsterdam. J P Besse and others "*Anionic clays: trends in pillary chemistry, its synthesis and microporous solids*" (1992), 2, 108, editors: M. I. Occelli, H. E. Robson, Van Nostrand Reinhold, N.Y.

In these reviews the authors state that a characteristic of anionic clays is that mild calcination at 500° C. results in the formation of a disordered MgO-like product. Said disordered MgO-like product is distinguishable from spinel (which results upon severe calcination) and from anionic clays. In this patent application we refer to said disordered MgO-like materials as Mg—Al solid solutions. Furthermore, these Mg—Al solid solutions contain a well-known memory effect whereby the exposure to water of such calcined materials results in the reformation of the anionic clay structure.

For work on anionic clays, reference is given to the following articles:

*Helv. Chim. Acta*, 25,106–137 and 555–569 (1942)
*J. Am. Ceram. Soc.*, 42, no. 3, 121 (1959)
*Chemistry Letters (Japan)*, 843 (1973)
*Clays and Clay Minerals*, 23, 369 (1975)
*Clays and Clay Minerals*, 28, 50 (1980)
*Clays and Clay Minerals*, 34, 507 (1996)
*Materials Chemistry and Physics*, 14, 569 (1986).

In addition there is an extensive amount of patent literature on the use of anionic clays and processes for their preparation.

European Patent Application 0 536 979 describes a method for introducing pH-dependent anions into the clay. The clay is prepared by the addition of a solution of $Al(NO_3)_3$ and $Mg(NO_3)_2$ to a basic solution containing borate anions. The product is then filtered, washed repeatedly with water, and dried overnight. Additionally mixtures of Zn/Mg are used.

In U.S. Pat. No. 3,796,792 by Miyata entitled "Composite Metal Hydroxides" a range of materials is prepared into which an extensive range of cations is incorporated, including Sc, La, Th, In, etc. In the examples given solutions of the divalent and trivalent cations are prepared and mixed with base to cause co-precipitation. The resulting products are filtered, washed with water, and dried at 80° C. Example 1 refers to Mg and Al and Example 2 to Mg and Bi. Other examples are given, and in each case soluble salts are used to make solutions prior to precipitation of the anionic clay at high pH.

In U.S. Pat. No. 3,879,523 by Miyata entitled "Composite Metal Hydroxides" also a large number of preparation examples is outlined. The underlying chemistry, however, is again based on the co-precipitation of soluble salts followed by washing and drying. It is important to emphasize that washing is a necessary part of such preparations, because to create a basic environment for co-precipitation of the metal ions a basic solution is needed and this is provided by $NaOH/Na_2CO_3$ solutions. Residual sodium, for example, can have a significant deleterious effect on the subsequent performance of the product as a catalyst or oxide support.

In U.S. Pat. No. 3,879,525 (Miyata) very similar procedures are again described.

In U.S. Pat. No. 4,351,814 to Miyata et al. a method for making fibrous hydrotalcites is described. Such materials differ in structure from the normal plate-like morphology. The synthesis again involves soluble salts. For example, an aqueous solution of a mixture of $MgCl_2$ and $CaCl_2$ is prepared and suitably aged. From this a needle-like product $Mg_2(OH)_3Cl.4H_2O$ precipitates. A separate solution of sodium aluminate is then reacted in an autoclave with the solid $Mg_2(OH)_3Cl.4H_2O$ and the product is again filtered, washed with water, and dried.

In U.S. Pat. No. 4,458,026 to Reichle, in which heat-treated anionic clays are described as catalysts for aldol condensation reactions, again use is made of magnesium and aluminum nitrate salt solutions. Such solutions are added to a second solution of NaOH and $Na_2CO_3$. After precipitation the slurry is filtered and washed twice with distilled water before drying at 125° C.

In U.S. Pat. No. 4,656,156 to Misra the preparation of a novel absorbent based on mixing activated alumina and hydrotalcite is described. The hydrotalcite is made by reacting activated MgO (prepared by activating a magnesium compound such as magnesium carbonate or magnesium hydroxide) with aqueous solutions containing aluminate, carbonate and hydroxyl ions. As an example the solution is made from NaOH, $Na_2CO_3$ and $Al_2O_3$. In particular, the synthesis involves the use of industrial Bayer liquor as the source of Al. The resulting products are washed and filtered before drying at 105° C.

In U.S. Pat. No. 4,904,457 to Misra a method is described for producing hydrotalcites in high yield by reacting activated magnesia with an aqueous solution containing aluminate, carbonate, and hydroxyl ions.

The methodology is repeated in U.S. Pat. No. 4,656,156.

In U.S. Pat. No. 5,507,980 to Kelkar et al. a process is described for making novel catalysts, catalyst supports, and absorbers comprising synthetic hydrotalcite-like binders. The synthesis of the typical sheet hydrotalcite involves reacting pseudoboehmite to which acetic acid has been added to peptize the pseudo-boehmite. This is then mixed with magnesia. More importantly, the patent summary states clearly that the invention uses mono carboxylic organic acids such as formic, propionic and isobutyric acid. In this patent the conventional approaches to preparing hydrotalcites are presented.

In U.S. Pat. No. 6,539,861 a process is disclosed for preparing a catalysts for synthesis gas production based on hydrotalcites. The method of preparation is again based, on the co-precipitation of soluble salts by mixing with base, for example, by the addition of a solution of $RhCl_3$, $Mg(NO_3)_2$ and $Al(NO_3)_3$ to a solution of $Na_2CO_3$ and NaOH.

Also in U.S. Pat. No. 5,399,537 to Bhattacharyya in the preparation of nickel-containing catalysts based on hydrotalcite use is made of the co-precipitation of soluble magnesium and aluminum salts.

In U.S. Pat No. 5,591,418 to Bhattacharyya a catalyst for removing sulfur oxides or nitrogen oxides from a gaseous mixture is made by calcining an anionic clay, said anionic clay having been prepared by co-precipitation of a solution of $Mg(NO_3)_2$, $Al(NO_3)_3$ and $Ce(NO_3)_3$. The product again is filtered and repeatedly washed with de-ionized water.

In U.S. Pat. No. 5,114,898/WO9110505 Pinnavaia et al. describe layered double hydroxide sorbents for the removal of sulfur oxide(s) from flue gases, which layered double hydroxide is prepared by reacting a solution of Al and Mg nitrates or chlorides with a solution of NAOH and $Na_2CO_3$. In U.S. Pat. No. 5,079,203/WO 9118670 layered double hydroxides intercalated with polyoxo anions are described, with the parent clay being made by co-precipitation techniques.

In U.S. Pat. No. 5,578,286, assigned to Alcoa, a process for the preparation of meixnerite is described. Said meixnerite may be contacted with a dicarboxylate or polycarboxylate anion to form a hydrotalcite-like material. In examples 5–6 hydromagnesite is contacted with pseudoboehmite under high $CO_2$ pressure to obtain hydrotalcite.

In U.S. Pat. No. 4,946,581 and U.S. Pat. No. 4,952,382 to van Broekhoven co-precipitation of soluble salts such as $Mg(NO_3)_2$ and $Al(NO_3)_3$ with, and without the incorporation of rare earth salts was used for the preparation of anionic clays as catalyst components and additives. A variety of anions and di- and tri-valent cations are described.

In U.S. Pat. No. 5,814,291 (Kelkar '291) discloses contacting an aluminum source with a magnesium source and an inorganic acid to make hydrotalcite-like material.

As indicated in the description of the prior art given-above, there are many applications of anionic clays. These include but are not restricted to: catalysts, adsorbents, drilling muds, catalyst supports and carriers, extenders and applications in the medical field. In particular van Broekhoven has described their use in $SO_x$ abatement chemistry.

Because of this wide variety of large-scale commercial applications for these materials, new processes utilizing alternative inexpensive raw materials are needed to provide a more cost-effective and environmentally compatible processes for making anionic clays. In particular, from the prior art described above one can conclude that the preparation process can be improved in the following ways: the use of cheaper sources of reactants, processes for easier handling of the reactants, so that there is no need for washing or filtration, eliminating the filtration problems associated with these fine-particled materials, the avoidance of alkali metals (which can be particularly disadvantageous for certain catalytic applications): In prior art preparations, organic acids were used to peptize alumina. The use of organic acids is expensive and introduces an additional step in the synthesis process and is therefore not cost-effective. Further, in drying or calcining the anionic clay prepared by prior art processes gaseous emissions of nitrogen oxides, halogens, sulfur oxides, etc. are encountered which cause environmental pollution problems.

It is particularly important that in the production of divalent metal-Al-containing anionic clays in a process where boehmite is peptized in an aqueous slurry with an inorganic acid and a divalent metal source is added to the slurry in excess of the stoicheometric requirement, that there not be an undesireable level of divalent metal salts in the clay product that would create a need for additional washing and filtering.

The term "divalent metal" will hereinafter be designated as "M".

SUMMARY OF THE INVENTION

In one embodiment, the present invention is a process for preparing M—Al-containing anionic clays. The process comprises first peptizing boehmite in a aqueous slurry with an acid. To that slurry is added an M source in an amount that is at least stoichiometric with respect to the aluminum in the boehmite. A base is then added to the slurry in an amount comprising from about 0.10 to about 0.30 moles of hydroxyl ions or equivalent thereof to moles of alumina (based on $Al_2O_3$) in the slurry, or at least the amount of base required to obtain a pH above 7 in the slurry, whichever is greater. The base may be added before, during or after the M source is added. The slurry is then aged.

Other embodiments of the invention encompass compositions made by the above processes and details about such processes including reactants and conditions.

DETAILED DESCRIPTION OF THE INVENTION

The present invention involves the use of boehmite in aqueous suspensions, where at ambient or elevated temperature M sources, for instance MgO or brucite, are added and the mixture is aged to result in the formation of an anionic clay. The powder X-ray diffraction pattern (PXRD) suggests that the product is comparable to anionic clays made by other standard methods. The physical and chemical properties of the product are also comparable to those anionic clays made by the other conventional methods. The overall process of this invention is very flexible, enabling a wide variety of anionic clay compositions and anionic clay-like materials involving for example carbonate, hydroxide and other anions to be prepared in an economically and environmental-friendly manner. The process may be carried out in a one step process either in batch or in continuous mode.

The boehmite that may be used includes both boehmites and pseudoboehmites such as Catapal®, Condea P3®, P200®, Laroche® etcetera). The boehmite is peptized with organic or inorganic acids, or mixtures thereof. These types of acids are not expensive and the use of inorganic acids renders the process cost-effective. Suitable inorganic acids are nitric acid, hydrochloric acid, sulfuric acid, sulfurous acid, sulfonic acid, phosphoric acid, phosphonic acid, phosphinic acid. Suitable organic acids include formic acid, acidic acid, oxalic acid, etc., or mixtures thereof. Of course mixtures of these acids can be used, and also a mixture of inorganic acid and organic acid can be used. Our invention embodies uses mixtures of boehmites and pseudoboehmites. Also the use of boehmites in mixture with other aluminum sources such as oxides and hydroxides of aluminum, (e.g. sols, aluminum trihydrate, and its thermally treated forms, flash calcined aluminum trihydrate), aluminum salts such as aluminum nitrate, aluminum chloride, aluminum chlorohydrate and sodium aluminate, is envisaged. Said other aluminum sources may be soluble or insoluble in water. Said different aluminum sources may be combined in any sequence in a slurry before and/or after the M source is added.

The di-valent metal (M) may comprise one or more of Ca, Mg, Zn, Ni, Cu, Co, and/or Fe. The preferred M is magnesium. Mg-bearing sources which may be used include MgO, $Mg(OH)_2$, magnesium acetate, magnesium formate, magnesium hydroxy acetate, magnesium carbonate, magnesium hydroxy carbonate, magnesium bicarbonate, magnesium nitrate, magnesium chloride, dolomite, sepiolite. Preferred Mg sources are MgO, $Mg(HO)_2$, and $MgCO_3$, because they are cheap, readily available and reactive in the reaction of the present invention. Both solid Mg sources as soluble Mg salts are suitable. Also combinations of Mg sources may be used.

The invention uses acids to efficiently peptize boehmite alumina so they become more reactive towards the M source, thus resulting in higher conversions of the alumina source and the M source to form anionic clays.

The aqueous suspension is obtained by adding M source to a slurry of peptized boehmite. The acid to peptize the boehmite is added prior to combining the M source with the boehmite. The amount of M added is at least stoichiometric with respect to the aluminum in the boehmite.

The amount of acid used to peptize the boehmite alumina depends on the type of acid, and the particular type and commercial grade of the boehmite alumina; consequently, the pH of the peptized alumina can vary as well. For some grades which are difficult and resist peptization, more acid has to be used and even a thermal treatment is necessary to achieve good peptization which results in a translucent material with low viscosity so it can be homogeneously mixed subsequently in large scale plant equipment with the MO and be fluid enough in order that can be easily handled by the commercial plant equipment, including the spray dryer.

However, while the acid peptization of the alumina causes dissolution of the alumina particles, as well as rendering the alumina more reactive towards the M source, the presence of acids inhibits the crystallization process which forms the anionic clay since the crystallization process of anionic clays is highly enhanced in alkaline media. Therefore, the overall process involves two chemical reactions (mechanisms), one taking place in an acidic medium, the other in a basic medium—each not being compatible with the other We have discovered that both reactions and objectives can be accomplished without compromising any of the two, or both, mechanisms (reactions) by using a two-step process of pH adjustments, or in other words, a "pH-swing" process.

Specifically, our invention involves: first highly efficiently peptizing the Boehmite Alumina with an acid or mixtures of acids and, second, adding an alkaline (base) to increase the pH before the aging process is initiated. The alkaline can be added to the slurry containing the peptized alumina before the M source is added, added together or after the M source has been added.

We have found the optimum amount of base to be added is in an amount comprising from about 0.10 to about 0.30 moles of hydroxyl ions or equivalent thereof to moles of alumina (based on $Al_2O_3$) in the slurry, or at least the amount of base required to obtain a pH above 7 in the slurry, whichever is greater. This will ensure that the slurry will always be alkaline for aging and provide control over the amount of excess M salts so that an undesireable amount in the product can be avoided. The M salts by themselves might be capable of raising the pH to above 7.0, but that would be likely to require an undesireable excess, so it is important that an additional base always be employed.

The bases that may be used include $NH_4OH$, NaOH, KOH, LiOH, $Na_2CO_3$, $NaHCO_3$, $Ba(OH)_2$ and $Ca(OH)_2$.

Equivalents of hydroxyl ions would include basic salts, such as carbonates, in amounts having the same basic effect of the hydroxides they replace.

In a preferred embodiment, the present invention is a process employing intimate mixing, for instance, milling or high shear mixing, carried out with the aqueous slurry comprising the anionic clay precursors before or at the same time the anionic clay is being formed.

The tem "milling" is defined as any method that results in reduction of particle size. Such a particle size reduction can at the same time result in the formation of reactive surfaces and/or heating of the particles. Instruments that can be used for milling include ball mills, high-shear mixers, colloid mixers, and electrical transducers that can introduce ultrasound waves into a slurry. Low-shear mixing, i.e. stirring that is performed essentially to keep the ingredients in suspension, is not regarded as milling.

High shear mixing or milling of the acid peptized alumina or milling of both the peptized alumina and M enhances the peptization and the reaction of the peptized alumina with the M.

The intimately mixed composition is highly suitable for use as an additive or as a matrix for catalysts for hydrocarbon conversion. This composition appears especially suitable for sulfur removal from the gasoline and diesel fraction in FCC, $SO_x$ and $NO_x$ removal in FCC, and as a metal trap.

Most if not all of the reaction between the M source and boehmite takes place in the aging step. The aging is preferably carried out hydrothermally under autogeneous conditions.

In the process according to the invention carbonate, hydroxyl, or other anions or mixtures thereof, either provided within the reaction medium for example as a soluble salt or absorbed during the synthesis from the atmosphere, are incorporated into the interlayer region as the necessary charge-balancing anion.

The aging step is carried out at temperatures from about 55° C. to about 250° C., preferably from about 65° C. to about 200° C. Aging may be in, e.g., an autoclave at temperatures below 100° C. as well as hydrothermally above 100° C. at increased pressures to maintain liquid phase. Hydrothermal treatment is particularly advantageous, because it is faster and a higher conversion is obtained compared to a conventional thermal treatment at atmospheric pressure. Further, larger crystals are obtained when using hydrothermal treatment. There is no need to wash or filter the product, as unwanted ions (e.g. sodium, ammonium, chloride, sulfate) which are frequently encountered when using other preparation methods, are absent in the product.

It is possible to purge the slurry with nitrogen or inert gas if an anionic clay with predominantly hydroxide anions is desired, but in general this is not necessary. Thus, the reaction can be conducted in the presence of $CO_2$. Said $CO_2$ may be added to the reaction from an outside source. The required time for aging may vary from about 15 minutes to up to about 48 hours, depending on temperature.

Anionic clays prepared by this method exhibit the well known properties and characteristics (e.g. chemical analysis, powder X-ray diffraction pattern, FTIR, thermal decomposition characteristics, surface area, pore volume, and pore size distribution) usually associated with anionic clays prepared by the customary and previously disclosed methods.

The anionic clay according to the invention has a layered structure corresponding to the general formula:

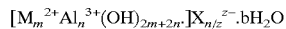

$$[M_m^{2+}Al_n^{3+}(OH)_{2m+2n}]X_{n/z}^{z-}\cdot bH_2O$$

Wherein m and n have a value such that m/n=1 to 10, preferably 1 to 6, and b has a value in the range of from 0 to 10, generally a value of 2 to 6 and often a value of about 4. X may be $CO_3^{2-}$, $OH^-$ or any other anion normally present in the interlayers of anionic clays. It is more preferred that m/n should have a value of 2 to 4, more particularly a value close to 3.

Since the process of the present invention does not require washing of the product or filtering, there is no filtrate waste or gaseous emissions (e.g. from acid decomposition), making the process particularly environmental-friendly and more suited to the environmental constraints which are increasingly imposed on commercial operations. The product can be spray dried directly to form microspheres or can be extruded to form shaped bodies.

Because of its simplicity, this process can be carried out in a continuous mode by mixing of a first slurry comprising peptized boehmite and a second slurry comprising M source, adding a desired amount of base and passing the mixed slurry through a reactor vessel which can operate under hydrothermal/autogeneous conditions.

The SOLVOTHERMAL plant apparatus involves multiple pressurized connected reactors. The Solvothermal plant (also: Supral unit) is an apparatus containing at least two, preferably 3–5 conversion vessels (autoclaves), through which a suspension can pass continuously, even at high solids-to-liquid ratios.

If desired, the anionic clay prepared by the process according to the invention may be subjected to ion exchange. Upon ion exchange the interlayer charge-balancing anions are replaced with other anions. Said other anions are the ones commonly present in anionic clays and include pillaring anions such as $V_{10}O_{28}^{-6}$, $Mo_7O_{24}^{6-}$. The ion exchange can be conducted before drying or after the anionic clay is formed in the slurry.

The process of the invention provides wide flexibility in preparing composites with a wide range of M:Al ratios. M sources may also be used in excess to obtain a composition comprising intimately mixed anionic clay and an M compound, usually in the form of an oxide or hydroxide, but it is important to control the amount of M source so as to not reach an undesireable level of M salts in the product.

It is also possible to prepare composites containing anionic clay, boehmite and an M compound with the process according to the invention by controlling the process conditions. In said composites the anionic clay, M compound, and optionally boehmite are intimately mixed, rather than present as separate phases such as in physically mixed mixtures of anionic clay, magnesium compound and boehmite. These composites appear to be highly suitable for use as an additive or as a matrix for catalysts for hydrocarbon conversion. These composites are specifically useful for FCC additives and for hydroprocessing, including Fischer Tröpsch catalyst. Further, these composites may be used as additives to polymers, plastics, rubber, resins and for forming nanocomposites.

For some applications it is desirable to have additives, both metals and non-metals, such as rare earth metals, Si, P, B, group VI, group VIII, alkaline earth (for instance Ca and Ba) and/or transition metals (for example Mn, Fe, Ti, Zr, Cu, Ni, Zn, Mo, Sn), present. These additives can easily be incorporated into the anionic clay by being deposited on the anionic clay, the composition containing anionic clay and boehmite or the composition containing M source, anionic clay and optionally bohmite. They can also be incorporated by being added either to the alumina or M source or to the slurry during preparation of the anionic clay.

With the help of additives the composites of the invention may be provided with desired catalytic functionalities, such as hydroprocessing including hydrodesulfurization or hydrodenitrogenation, hydrodemetalization, or the desired functionality may be increased by the addition of additives.

The anionic clays prepared by the process of the present of the present invention may be exfoliated using known techniques in the state of the art for exfoliating materials.

The anionic clays prepared by the present invention may also be flash calcined to alter their properties. Flash calcined materials may be re-hydrated.

The anionic clays or composites of the invention may be formed into shaped bodies. Shaping may optionally be carried out either prior to or after aging to obtain shaped bodies. Suitable shaping methods include spray-drying, pelletizing, extrusion (optionally combined with kneading), beading (spherizing), or any other conventional shaping method used in the catalyst and absorbent fields or combinations thereof. The amount of liquid present in the precursor mixture used for shaping should be adapted to the specific shaping step to be conducted. It might be advisable to (partially) remove the liquid used in the precursor mixture and/or add additional or other liquid, and/or change the pH of the precursor mixture to make the precursor mixture gellable and thus suitable for shaping. Various additives commonly used in the various shaping methods such as extrusion additives may be added to the precursor mixture used for shaping.

Exfoliation and flash calcining can be carried out on the shaped bodies.

Upon being heated, anionic clays generally form M-Al solid solutions, and at higher temperatures, spinels. When used as a catalyst, an adsorbent (for instance a $SO_x$ adsorbent for catalytic cracking reactions), or a catalyst support, the anionic clay according to the invention is usually heated during preparation and is thus in the M-Al solid solution form. During use in an FCC unit, the catalyst or adsorbent is converted from an anionic clay into M-Al solid solutions.

Therefore, the present invention is also directed to a process wherein an anionic clay prepared by the reaction according to the invention, is heat-treated at a temperature between 300 and 1200° C. to form a M-Al-containing solid solution and/or spinel.

The present invention is illustrated by the following examples which are not to be considered limiting by any means.

EXAMPLES

Example 1

Condea P3 commercial grade quasi-crystalline Boehmite was slurried water sufficient to produce a slurry containing about 20% solids and mixed with a high shear mixer. While mixing, nitric acid was added slowly until slurry became translucent and the initial high viscosity was reduced, efficiently that efficient mixing was possible with the equipment. Said slurry was divided in four portions, A, B, C and D, which were treated as follows.

A. Portion

Magnesium oxide was added with mixing, sufficient to obtain a Mg to Al molar ratio of about 2 in the solids of the slurry. Final slurry was divided in four portions, which were aged in individual containers at 85° C. for 4, 8, and 16 hours. The fourth portion was aged at 165° C. for one hour under hydrothermal conditions. After the aging, the four samples were dried and analyzed by XRD. Results indicated traces of Anionic clay were formed in all the samples.

B. Portion

To the peptized Alumina slurry, sodium hydroxide was added sufficient that after the addition of the Magnesium oxide with mixing the final pH was about 10. The Mg to Al molar ratio in this portion was about 2 as in Portion A. Similarly to Portion A, four samples were taken and aged at 85° C. for 4, 8, and 16 hours. The fourth sample aged at 165° C. for one hour. XRD analysis of the aged samples indicated substantial amounts of Anionic clay formed.

C. Portion

To the peptized Alumina slurry, the Magnesium oxide was added first followed with the addition of the sodium hydroxide. The rest of the processing was the same as in B. Portion. The aged samples were dried and analyzed by XRD which showed substantial amounts of Anionic clays formed in all four samples.

D. Portion.

The sample preparation was same as in B. Portion, except that the sodium hydroxide was added to a separate slurry which contained only the Magnesium oxide which then said slurry containing the MgO and the sodium hydroxide was added to the slurry which contained the peptized Alumina. Slurries were well mixed and four samples were taken out and aged as in A, B, and C Portions. XRD analysis indicated that all four samples after the aging contained substantial amounts of Anionic clay.

Example 2

Example 1 (Portion B) was repeated, except that the sodium hydroxide was replaced with Ammonium hydroxide. The rest of the sample preparation was the same. XRD analysis indicated all four aged samples contained substantial amounts of Hydrotalcite Anionic clay.

Example 3

A quasi-crystalline Boehmite Alumina commercial grade Catapal was peptized with nitric acid sufficiently until the slurry became translucent and of low viscosity. Said slurry was divided in two portions (A) and (B).

To the Portion (A) sodium hydroxide was added sufficient in order to bring the pH of the slurry close to neutral. Subsequently, Magnesium oxide was added in the amount that gave a Mg to Al molar ratio in the slurry of about 0.5 and slurry was homogenized using a high shear mixer. The slurry was then divided into two samples. One was aged at 8 hours at 85° C. and the other at 165° C. for 2 hours. XRD analysis of the samples indicated substantial amounts of Hydrotalcite Anionic clay was formed in both samples, being present together with Boehmite in composite forms.

To the Portion (B) of the peptized Alumina, the same amount of Magnesium oxide was added, and slurry was homogenized with high shear mixing and subsequently divided into two samples. Sample one was aged at 85° C. for 8 hours and sample two was aged at 165° C. for 2 hours. XRD analysis indicated only traces of Hydrotalcite Anionic clay were formed in both samples.

What is claimed is:

1. A process for preparing divalent metal-Al-containing anionic clays comprising peptizing boehmite in a aqueous slurry with an acid and adding a divalent metal source to said slurry in an amount that is at least stoichiometric with respect to the aluminum in said boehmite, adding a base to said slurry in an amount comprising from about 0.10 to about 0.30 moles of hydroxyl ions or equivalent thereof to moles of alumina (based on $Al_2O_3$) in said slurry, or at least the amount of base required to obtain a pH above 7 in said slurry, whichever is greater, said base being added before, during or after said divalent metal source is added, and aging said slurry.

2. The process of claim 1 wherein the boehmite is pseudoboehmite.

3. The process of claim 1 wherein the divalent metal is magnesium.

4. The process of claim 3 wherein the Mg source is MgO, $Mg-CO_3$, $Mg(OH)_2$, brucite, magnesium hydroxy carbonate, or mixtures thereof.

5. The process of claim 1 wherein beside boehmite other alumina sources are present in the slurry.

6. The process of claim 1 wherein one or more metals or non-metals, other than the divalent metal or Al, selected from the group consisting of rare earth metals, silicon, phosphorous, boron, Group VI metals, Group VIII metals, alkaline earth metals and transition metals, may be present in the slurry.

7. The process of claim 1 wherein a first slurry comprising peptized boehmite is combined with a second slurry comprising a divalent metal source.

8. The process of claim 7 wherein one or more metals or non-metals, other than the divalent metal and Al, that may be present in the first and/or the second slurry are selected from the group consisting of rare earth metals, silicon, phosphorous, boron, Group VI metals, Group VIII metals, alkaline earth metals and transition metals.

9. The process of claim 7 wherein the process is carried out in a continuous mode.

10. The process of claim 1 wherein additives are incorporated into said anionic clays.

11. The process of claim 1 wherein said anionic clays are subjected to an ion-exchange treatment.

12. The process of claim 1 wherein said anionic clays are ion exchanged with pillaring anions.

13. The process of claim 12 wherein said pillaring anions comprise $V_{10}O_{28}^{6-}$ or $Mo_7O_{24}^{6-}$, or both.

14. The process of claim 1 wherein one or more metals or non-metals selected from the group consisting of rare earth metals, silicon, phosphorous, boron, Group VI metals, Group VIII metals, alkaline earth metals and transition metals are deposited on said anionic clay.

15. The process of claim 1 wherein aging is carried out at a temperature from about 55° C. to about 250° C.

16. The process of claim 1 wherein said slurry is milled.

17. The process of claim 1 wherein said anionic clays are exfoliated.

18. The process of claim 1 wherein said anionic clays are flash calcined.

19. The process of claim 18 wherein said anionic clays that have been flash calcined are re-hydrated.

20. The process of claim 1 wherein said anionic clays are shaped.

21. The process of claim 20 wherein the shaped anionic clays are exfoliated or flash calcined.

22. The process of claim 20 wherein shaped anionic clays that have been flash calcined are re-hydrated.

23. A process for the preparation of a divalent metal-Al-containing solid solution and/or spinel, wherein an anionic clay obtained by the process of claim 1 is subjected to a heat-treatment at a temperature between 300 and 1200° C.

* * * * *